United States Patent
Nakao

(10) Patent No.: US 9,547,292 B2
(45) Date of Patent: Jan. 17, 2017

(54) INPUT DEVICE, INPUT METHOD, AND ELECTRONIC APPARATUS THAT SUPPRESSES INFORMATION LEAKAGE

(71) Applicant: KYOCERA Document Solutions Inc., Osaka (JP)

(72) Inventor: Mitsutoshi Nakao, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 342 days.

(21) Appl. No.: 14/225,434

(22) Filed: Mar. 26, 2014

(65) Prior Publication Data

US 2014/0297003 A1 Oct. 2, 2014

(30) Foreign Application Priority Data

Mar. 28, 2013 (JP) .................. 2013-068882

(51) Int. Cl.

| G06F 3/0488 | (2013.01) |
|---|---|
| G05B 15/02 | (2006.01) |
| G03G 15/00 | (2006.01) |
| G06F 3/041 | (2006.01) |
| G06F 21/31 | (2013.01) |
| G06F 21/32 | (2013.01) |

(52) U.S. Cl.
CPC ........... *G05B 15/02* (2013.01); *G03G 15/5016* (2013.01); *G06F 3/0416* (2013.01); *G06F 3/0488* (2013.01); *G06F 21/31* (2013.01); *G06F 21/32* (2013.01)

(58) Field of Classification Search
CPC ..................... G06F 3/016; G06F 3/041–3/047; G06F 3/0488; G06F 21/30–21/46

USPC ................. 178/18.01–19.07; 340/5.8–5.86; 345/173–178; 713/183
See application file for complete search history.

(56) References Cited

U.S. PATENT DOCUMENTS

| 2011/0128243 A1* | 6/2011 | Murakoshi | ............. G06F 21/32 345/173 |
|---|---|---|---|
| 2011/0242035 A1* | 10/2011 | Nozawa | ................. G06F 3/041 345/173 |
| 2012/0299855 A1* | 11/2012 | Nakazawa | ........... G06F 3/0488 345/173 |

FOREIGN PATENT DOCUMENTS

| JP | 2004-062867 A | 2/2004 |
|---|---|---|
| JP | 2007-320053 A | 12/2007 |
| JP | 2010-282346 A | 12/2010 |
| JP | 2011-118456 A | 6/2011 |
| JP | 2012-141869 A | 7/2012 |
| JP | 2012-181648 A | 9/2012 |

* cited by examiner

*Primary Examiner* — Michael Pervan
(74) *Attorney, Agent, or Firm* — James Judge

(57) ABSTRACT

An input device includes a touch panel and a control unit. The touch panel is configured to be switched between a normal operation mode and a special operation mode. The control unit is configured to control the touch panel. In the special operation mode, the control unit is configured to: generate a special-operation-mode-based input portion based on a continuous contact with the touch panel; and accept a release of the continuous contact with the touch panel as an input to the special-operation-mode-based input portion.

16 Claims, 6 Drawing Sheets

INPUT DEVICE, INPUT METHOD, AND ELECTRONIC APPARATUS THAT SUPPRESSES INFORMATION LEAKAGE

CROSS-REFERENCE TO RELATED APPLICATION

This application is based upon, and claims the benefit of priority from, corresponding Japanese Patent Application No. 2013-068882 filed in the Japan Patent Office on Mar. 28, 2013, the entire contents of which are incorporated herein by reference.

BACKGROUND

Unless otherwise indicated herein, the description in this section is not prior art to the claims in this application and is not admitted to be prior art by inclusion in this section.

To prevent an illegal operation involving the impersonation of a person, an authentication function for a user is required for an electronic apparatus. In a typical electronic apparatus, authentication in which authentication information (such as a password) is input via an input device has been widely used. However, at the time of input, if the motion of the hand of the user and the input device of the electronic apparatus are seen by a third person, the input information may be leaked to the third person.

To solve this problem, an input device that prevents input information from being known by the third person has been proposed. This input device includes a voice generating unit that generates a voice, and performs an input operation based on information obtained by the sense of hearing in addition to the sense of vision of the user. Accordingly, even if the motion of the hand of the user and the input unit of the electronic apparatus are seen by a third person, this input device prevents leakage of the input information.

In addition to the input device using the voice, an input device that can read biological information of a human is examined. In this input device, physical features (such as fingerprints and the iris) of a human are input so as to prevent information leakage due to a furtive glance by a third person.

SUMMARY

An input device according to the disclosure includes a touch panel and a control unit. The touch panel is configured to be switched between a normal operation mode and a special operation mode. The control unit is configured to control the touch panel. In the special operation mode, the control unit is configured to: generate a special-operation-mode-based input portion based on a continuous contact with the touch panel; and accept a release of the continuous contact with the touch panel as an input to the special-operation-mode-based input portion.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
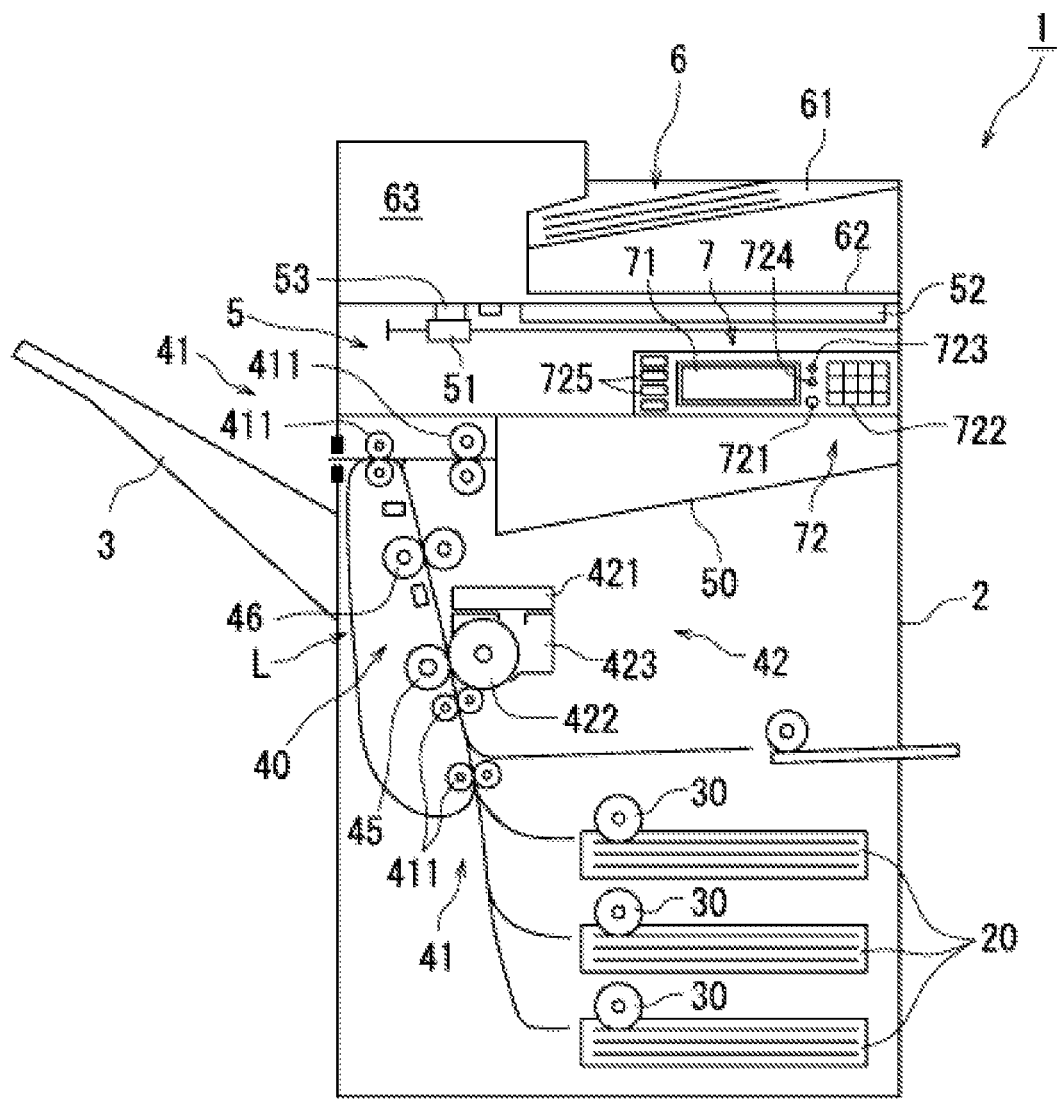
FIG. 1 is a schematic diagram illustrating one embodiment of an image forming apparatus according to the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of an input device 10, an input method, and an electronic apparatus 1 in which the input device 10 is mounted according to the disclosure with reference to FIG. 1 to FIG. 6. As one example of the electronic apparatus 1, an image forming apparatus (hereinafter referred to as an image forming apparatus 1 in some cases) will be described.

Figure 2:
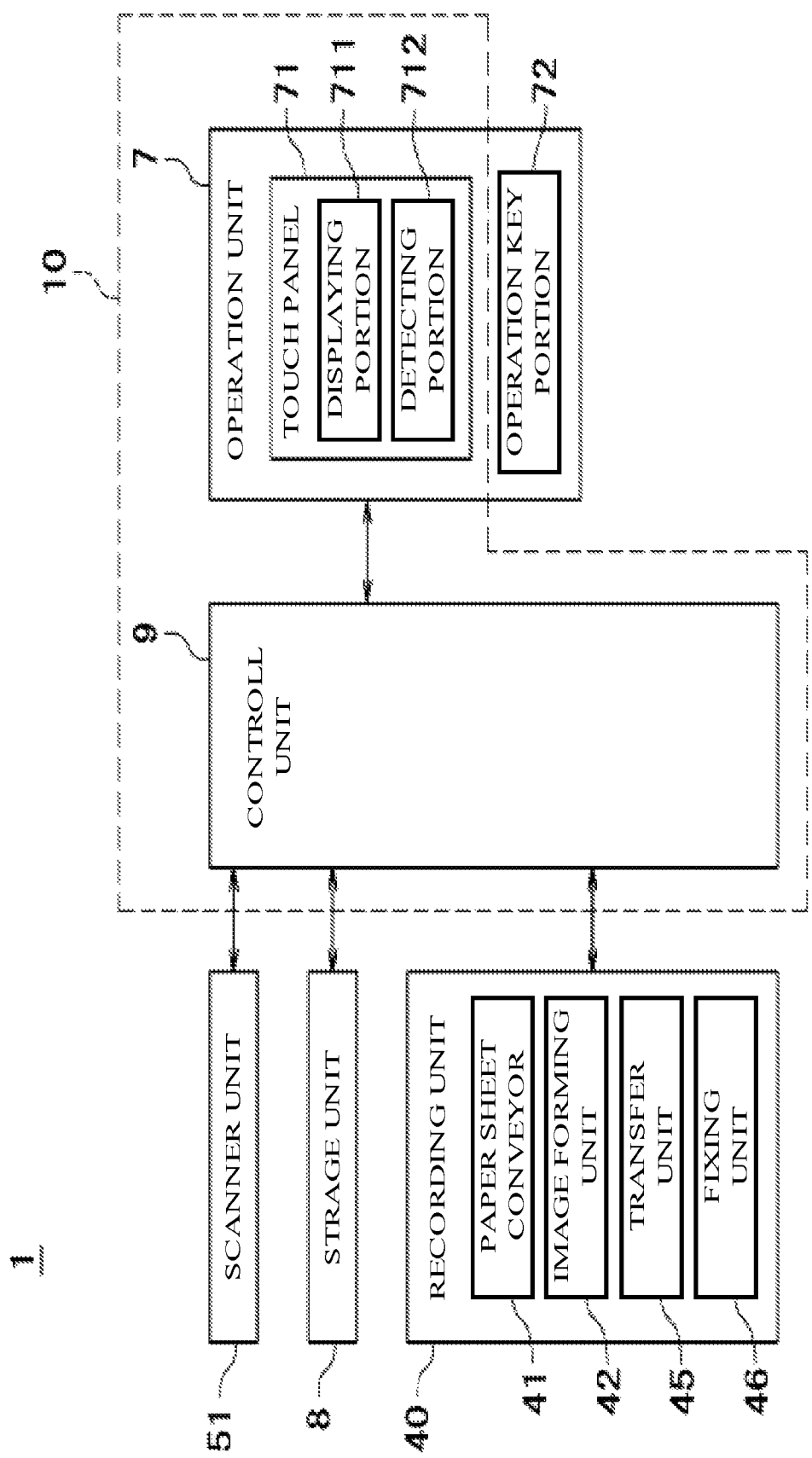
FIG. 2 is a control block diagram of the image forming apparatus according to the disclosure.

The image forming apparatus 1 according to the disclosure will be described with reference to FIG. 1 and FIG. 2. FIG. 1 is a schematic diagram illustrating one embodiment of the image forming apparatus 1 according to the disclosure. FIG. 2 is a control block diagram of the image forming apparatus 1 illustrated in FIG. 1. The image forming apparatus 1 may be a copier, a printer, a facsimile, or a multi-functional peripheral that has a combination of functions of these devices. The image forming apparatus 1 includes a main unit 2, a stack tray 3, a document reading unit 5, a document feeding unit 6, an operation unit 7, a storage unit 8, and a control unit 9.

The main unit 2 includes a plurality of sheet feed cassettes 20, a plurality of paper sheet feeding rollers 30, a recording unit 40, and a discharge tray 50.

The paper sheet feeding roller 30 is located in each of the plurality of sheet feed cassettes 20. The paper sheet feeding roller 30 feeds a paper sheet one-by-one from the sheet feed cassette 20 so as to convey the paper sheet to the recording unit 40.

The recording unit 40 forms an image on the paper sheet conveyed from the sheet feed cassette 20. The recording unit 40 includes a paper sheet conveyor 41, an image forming unit 42, a transfer unit 45, and a fixing unit 46.

The paper sheet conveyor 41 is constituted of a plurality of conveyance rollers 411 arranged along a sheet conveying path. The paper sheet conveyor 41 conveys a paper sheet, which is fed from the sheet feed cassette 20, to the stack tray 3 or the discharge tray 50.

The image forming unit 42 includes an optical unit 421, a photoreceptor drum 422, and a developing unit 423. The optical unit 421 outputs a laser beam based on image data obtained by a scanner unit 51 (described later) so as to expose the photoreceptor drum 422. The developing unit 423 forms a toner image on the photoreceptor drum 422.

The transfer unit 45 transfers the toner image on the photoreceptor drum 422 to a paper sheet. The fixing unit 46 heats the paper sheet on which the toner image is transferred so as to fix the toner image on the paper sheet.

The document reading unit 5 includes the scanner unit 51, a document table 52, and a document reading slit 53. The scanner unit 51 is moved by a driving unit (not illustrated). The document table 52 is constituted of a transparent material such as glass.

When the scanner unit 51 reads a document placed on the document table 52, the scanner unit 51 moves along a document surface in a position facing the document table 52. Subsequently, the scanner unit 51 outputs image data obtained by scanning the document image to a control unit 90. When the scanner unit 51 reads a document fed by the document feeding unit 6, the scanner unit 51 moves to a position facing the document reading slit 53. Subsequently, the scanner unit 51 outputs image data obtained in synchronization with the conveying operation of the document by the document feeding unit 6, to the control unit 90.

The document feeding unit 6 includes a document placing portion 61, a document discharging unit 62, and a document conveying mechanism 63. The document feeding unit 6 is mounted to turn with respect to the main unit 2. Turning the document feeding unit 6 with respect to the main unit 2 causes the front side of the document feeding unit 6 to face upward. As a result, a document to be read, for example, a book in a two-page spread state can be placed on the top surface of the document table 52.

The document conveying mechanism 63 feeds the document placed on the document placing portion 61 one-by-one to convey the document to a position facing the document reading slit 53. Subsequently, the document conveying mechanism 63 discharges the document to the document discharging unit 62 after the termination of reading the image of the document by the scanner unit 51.

The operation unit 7 includes a touch panel 71 and an operation key portion 72. The touch panel 71 includes a displaying portion 711 and a detecting portion 712. The displaying portion 711 displays operation guide information for various functions and similar information. The detecting portion 712 detects a touch operation to the displaying portion 711. For example, the displaying portion 711 is a liquid crystal display unit, and the detecting portion 712 is a position instruction device such as a touch pad. In this embodiment, the touch panel 71 is movably (for example, rotatably) installed on the main unit 2.

The operation key portion 72 includes a start key 721, a numeric keypad 722, a reset key 723, a stop key 724, and a function switching key 725. The reset key 723 is used for resetting a set content set by the displaying portion 711 and similar information. The stop key 724 is used for stopping an image forming operation under execution. The function switching key 725 is used for switching between a copy function, a printer function, a scanner function, and a facsimile function.

The operation unit 7 outputs an operation signal to the control unit 90 corresponding to an operation to the touch panel 71 or the operation key portion 72. The operation to the operation unit 7 causes the image forming apparatus 1 to execute a desired function.

The storage unit 8 stores document data to be printout, information indicative of countermeasures against errors (such as paper clogging) occurring in the image forming apparatus 1, and operation logs of the image forming apparatus 1. The storage unit 8 stores verification data for user authentication. The storage unit 8 is, for example, a storage device such as a hard disk drive (HDD).

The control unit 9 controls a plurality of units included in the image forming apparatus 1. Specifically, the control unit 9 controls the document reading unit 5, the document feeding unit 6, and the operation unit 7.

Figure 3:
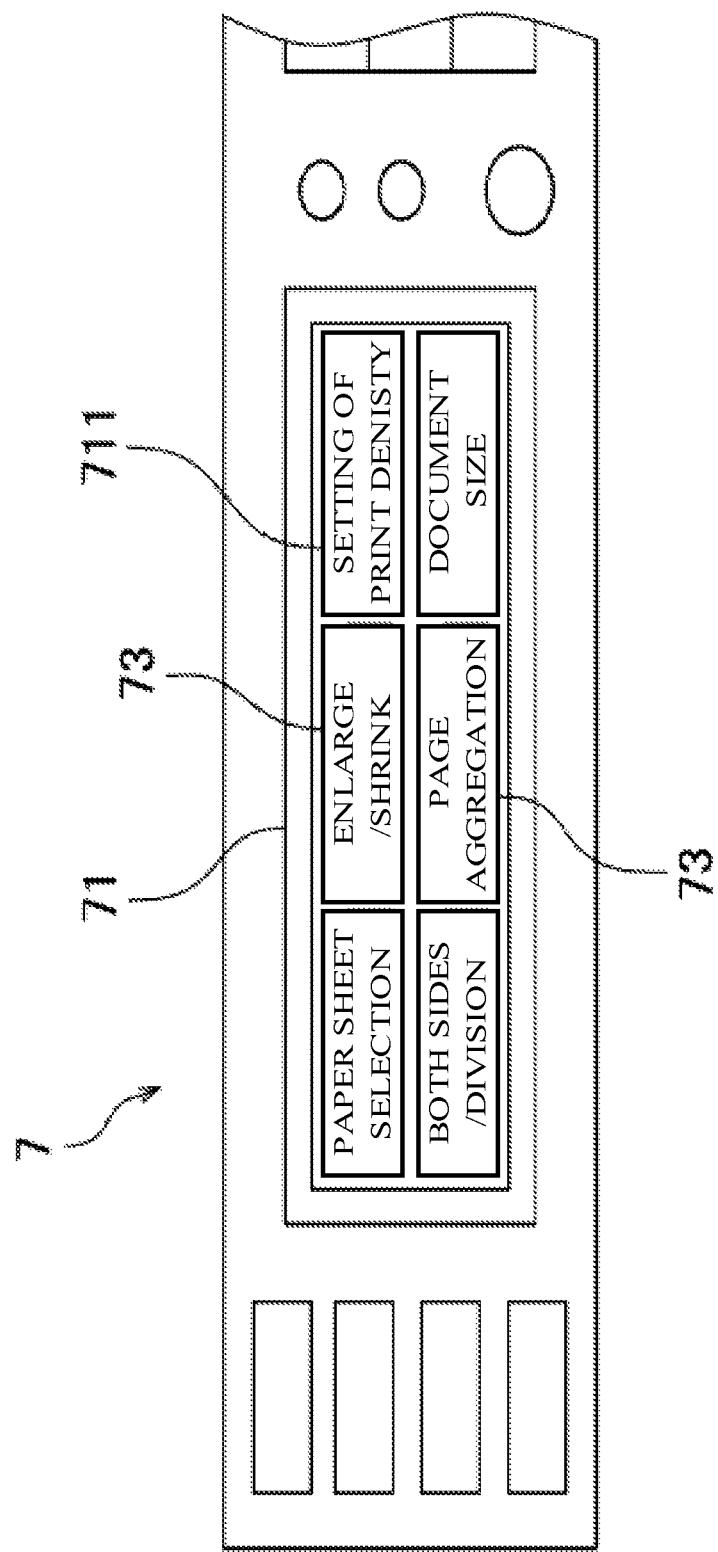
FIG. 3 is a schematic diagram illustrating an operation mode of a touch panel in an input device according to the disclosure.
Figure 4:
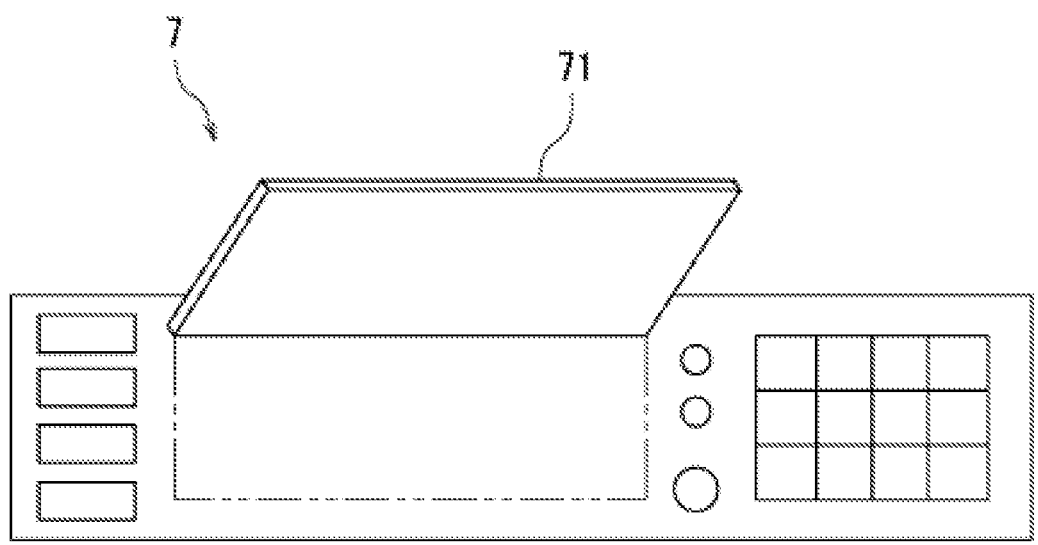
FIG. 4 is a schematic diagram illustrating another operation mode of the touch panel in the input device according to the disclosure.
Figure 5:
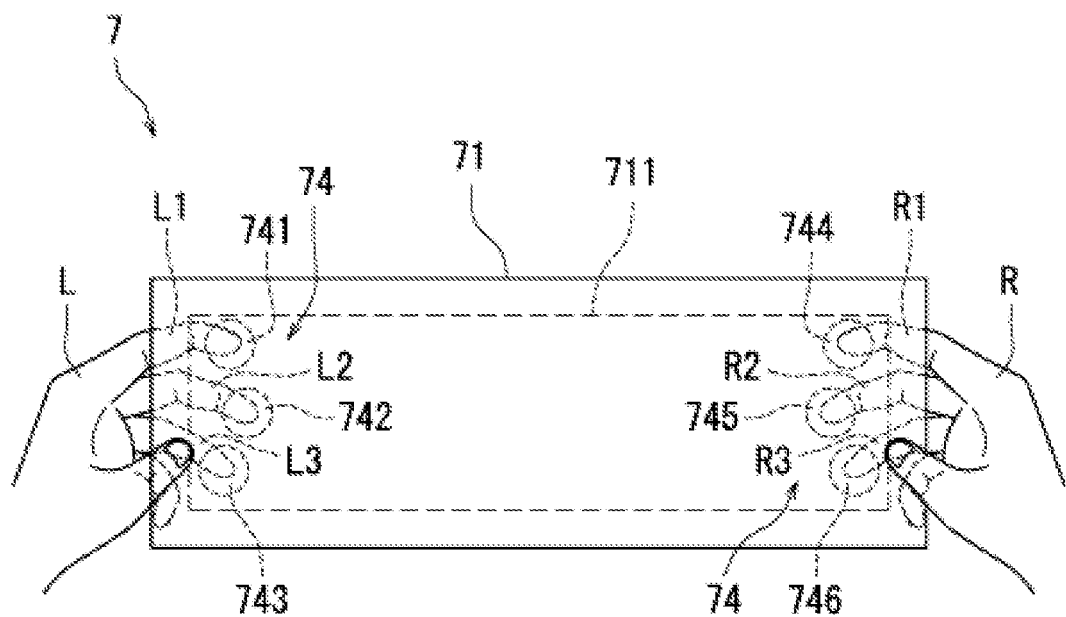
FIG. 5 is a schematic diagram illustrating a state where the touch panel is operated in the other operation mode according to the disclosure.

The input device 10 according to the disclosure includes the touch panel 71 and the control unit 9 in this embodiment. FIG. 3 is a schematic diagram illustrating an operation mode of the touch panel 71 of the input device 10 in this embodiment. FIG. 4 is a schematic diagram illustrating another operation mode of the touch panel 71 of the input device 10 in this embodiment. FIG. 5 is a schematic diagram illustrating a state where the touch panel 71 is operated in the operation mode illustrated in FIG. 4. The following describes the input device 10 of this embodiment with reference to FIG. 1 to FIG. 5.

The touch panel 71 is configured to be switched between a normal operation mode and a special operation mode. In other words, the touch panel 71 has a normal operation mode and a special operation mode. The normal operation mode is an operation mode used in the case where it is not necessary to suppress leakage of the input information. The special operation mode is an operation mode used in the case where it is necessary to suppress leakage of the input information. The normal operation mode and the special operation mode are switched by changing the position of the touch panel 71.

In the normal operation mode, the touch panel 71 is arranged in a position where the user can operate the function of the image forming apparatus 1 while watching the displaying portion 711 of the touch panel 71. For example, as illustrated in FIG. 1 and FIG. 3, in the normal operation mode, the displaying portion 711 of the touch panel 71 faces the user that operates the function of the image forming apparatus 1 while standing on the front side of the image forming apparatus 1.

In the normal operation mode, the control unit 9 generates a normal-operation-mode-based input portion 73 representing the operation guide information of various functions of the image forming apparatus 1, and displays the normal-operation-mode-based input portion 73 on the touch panel 71. The normal-operation-mode-based input portion 73 is displayed on the displaying portion 711 of the touch panel 71 as software keys in predetermined shapes (hereinafter, the normal-operation-mode-based input portion 73 is referred to as the software key 73 in some cases). For example, as illustrated in FIG. 3, when the control unit 9 causes the image forming apparatus 1 to execute a document copying function, the control unit 9 generates and displays the software key 73 on the displaying portion 711 of the touch panel 71 and assigns functions such as "selection of paper sheet" and "setting of print density" to the software keys 73. At the time of the operation, corresponding to the function executed by the image forming apparatus 1, the user brings contact means (such as a finger and a stylus pen, and a finger will be described as an example below) into contact with the touch panel 71 in the position where the software key 73 is displayed on the displaying portion 711.

In the normal operation mode, in the case where a contact occurs in the position where the software key 73 is displayed on the displaying portion 711, the detecting portion 712 of the touch panel 71 detects the position in contact and then outputs a signal indicative of the contact position to the control unit 9. The control unit 9 identifies the software key 73 in contact with the user based on the signal indicative of the contact position and accepts the contact at the position of the software key 73 in the displaying portion 711 as an input to the software key 73, so as to cause the image forming apparatus 1 to execute a function represented by the software key 73. For example, when the user makes contact at the position where the software key 73 representing "setting of print density" illustrated in FIG. 3 is displayed, the control unit 9 determines that the software key 73 representing "setting of print density" receives an input and additionally displays a function for setting a print density for copy operation on the displaying portion 711.

As described with reference to FIG. 3, in the normal operation mode, the user operates the function of the image forming apparatus 1 while watching the software key 73 displayed on the touch panel 71. In this case, when there is a third person near the user, the information input during the operation might be seen by the third person.

On the other hand, in the special operation mode, the touch panel 71 is arranged such that the displaying portion 711 is not easily seen so as to suppress leakage of the input information. For example, as illustrated in FIG. 4, in the special operation mode, the displaying portion 711 of the touch panel 71 faces toward the back-side direction of the image forming apparatus 1 so as not to be seen by the user that operates the function of the image forming apparatus 1 while standing at the front side of the image forming apparatus 1 or the third person in the vicinity of the user. In this case, as illustrated in FIG. 5, the user touches the touch panel 71 with fingers in a state where the displaying portion 711 cannot be seen, to operate the function of the image forming apparatus 1.

In the special operation mode, the control unit 9 generates a special-operation-mode-based input portion 74 based on continuous contact with the touch panel 71. The special-operation-mode-based input portion 74 is constituted of special-operation-mode-based input portions 741 to 746. Specifically, when the user keeps touching the touch panel 71 with the fingers for a preliminarily set period or more, the detecting portion 712 recognizes this contact as the continuous contact and detects contact positions, and then outputs a signal indicative of the contact positions to the control unit 9. The control unit 9 generates the special-operation-mode-based input portions 74 corresponding to the contact positions on the touch panel 71 based on this signal. Here, the special-operation-mode-based input portion 74 is not displayed on the displaying portion 711 so as not to be recognized by a third person. However, the disclosure is not limited to this. The special-operation-mode-based input portion 74 may be displayed on the displaying portion 711 as a software key with a predetermined shape.

In the special operation mode, an input to the special-operation-mode-based input portion 74 is performed by releasing the continuous contact with the touch panel 71. Specifically, when the user releases the finger from the displaying portion 711 of the touch panel 71 in a state where the special-operation-mode-based input portion 74 has been generated, the detecting portion 712 detects the position where the continuous contact is released and then outputs a signal indicative of the contact release position to the control unit 9. The control unit 9 identifies the special-operation-mode-based input portion 74 from which the user has released the contact based on the signal indicative of the contact release position, and accepts the release of the continuous contact at the position corresponding to the special-operation-mode-based input portion 74 as an input to the special-operation-mode-based input portion 74. Based on the input to the special-operation-mode-based input portion 74, the control unit 9 can additionally cause the image forming apparatus 1 to execute a predetermined operation. Here, when the continuous contact is released and the input of the corresponding special-operation-mode-based input portion 74 is accepted, the special-operation-mode-based input portion 74 disappears from the displaying portion 711.

As described with reference to FIG. 4 and FIG. 5, in the special operation mode, the displaying portion 711 of the touch panel 71 is arranged not to be easily seen and the motion of the finger is hidden by the touch panel 71 during the operation. This suppresses leakage of the information input during the operation due to being seen by a third person.

In this embodiment, it can be determined whether or not the operation mode of the touch panel 71 has been switched by detecting the inclination of the touch panel 71. For example, the input device 10 further includes an acceleration sensor (not illustrated). The acceleration sensor outputs a signal indicative of acceleration information of the touch panel 71 to the control unit 9. The control unit 9 detects the inclination of the touch panel 71 based on the signal indicative of the acceleration information and then determines whether or not the operation mode of the touch panel 71 has been switched based on the result of the detection. The user can preliminarily set a threshold value of the inclination used to determine whether or not the operation mode has been switched.

The following describes an input method for performing an input operation to the input device 10 of this embodiment in the special operation mode with reference to FIG. 1 to FIG. 5.

Firstly, the operation mode of the touch panel 71 is switched from the normal operation mode to the special operation mode. Specifically, as illustrated in FIG. 4, the touch panel 71 is turned such that the displaying portion 711 of the touch panel 71 is not seen by the user or a third person in the vicinity of the user.

Subsequently, the special-operation-mode-based input portion 74 is generated by making continuous contact with the touch panel 71. Specifically, keeping the contact with the touch panel 71 using fingers for a preliminarily set period or more causes the control unit 9 to generate the special-operation-mode-based input portions 74. For example, as illustrated in FIG. 5, an index finger L1, a middle finger L2, and a ring finger L3 of a left hand L are brought into contact with the touch panel 71 so as to generate a special-operation-mode-based input portion 741, a special-operation-mode-based input portion 742, and a special-operation-mode-based input portion 743. An index finger R1, a middle finger R2, and a ring finger R3 of a right hand R are brought into contact with the touch panel 71 so as to generate a special-operation-mode-based input portion 744, a special-operation-mode-based input portion 745, and a special-operation-mode-based input portion 746.

Subsequently, the continuous contact with the touch panel 71 is released to perform an input operation to the special-operation-mode-based input portion 74. Specifically, corresponding to the special-operation-mode-based input portion 74 to which an input operation is desired to be performed, the finger corresponding to this special-operation-mode-based input portion 74 is released form the touch panel 71. For example, in the case where an input operation is performed only to the special-operation-mode-based input portion 744 illustrated in FIG. 5, the index finger R1 of the right hand R is released form the touch panel 71. In the case where an input operation is performed to another specialoperation-mode-based input portion 74 (which is any of special-operation-mode-based input portions 741 to 743, 745, and 746) in addition to the special-operation-mode-based input portion 744, the finger corresponding to this special-operation-mode-based input portion 74 is released form the touch panel 71 in addition to the index finger R1.

The generation and the input operation of the special-operation-mode-based input portion 74 may be repetitively performed. For example, after the index finger R1 of the right hand R illustrated in FIG. 5 is released from the touch panel 71 so as to perform an input operation to the special-operation-mode-based input portion 744, the index finger R1 may be brought into contact with the touch panel 71 again so as to generate the special-operation-mode-based input portion 744. Subsequently, the index finger R1 may be released from the touch panel 71 so as to perform an input operation to the special-operation-mode-based input portion 744 twice.

In FIG. 5, the index fingers, the middle fingers, and the ring fingers of both hands are brought into contact with the touch panel 71. However, the disclosure is not limited to this. The fingers of one hand may be brought into contact with the touch panel 71. Additionally, instead of the plurality of fingers, only one finger may be brought into contact with the touch panel 71.

The input device 10, the input method for the input device 10, and the image forming apparatus 1 with the input device 10 according to this embodiment have been described with reference to FIG. 1 to FIG. 5. In this embodiment, the touch panel 71 of the input device 10 has the normal operation mode and the special operation mode. This ensures an operation in which an appropriate operation mode is selected corresponding to necessity for suppressing leakage of information during the operation of the image forming apparatus 1.

Figure 6:
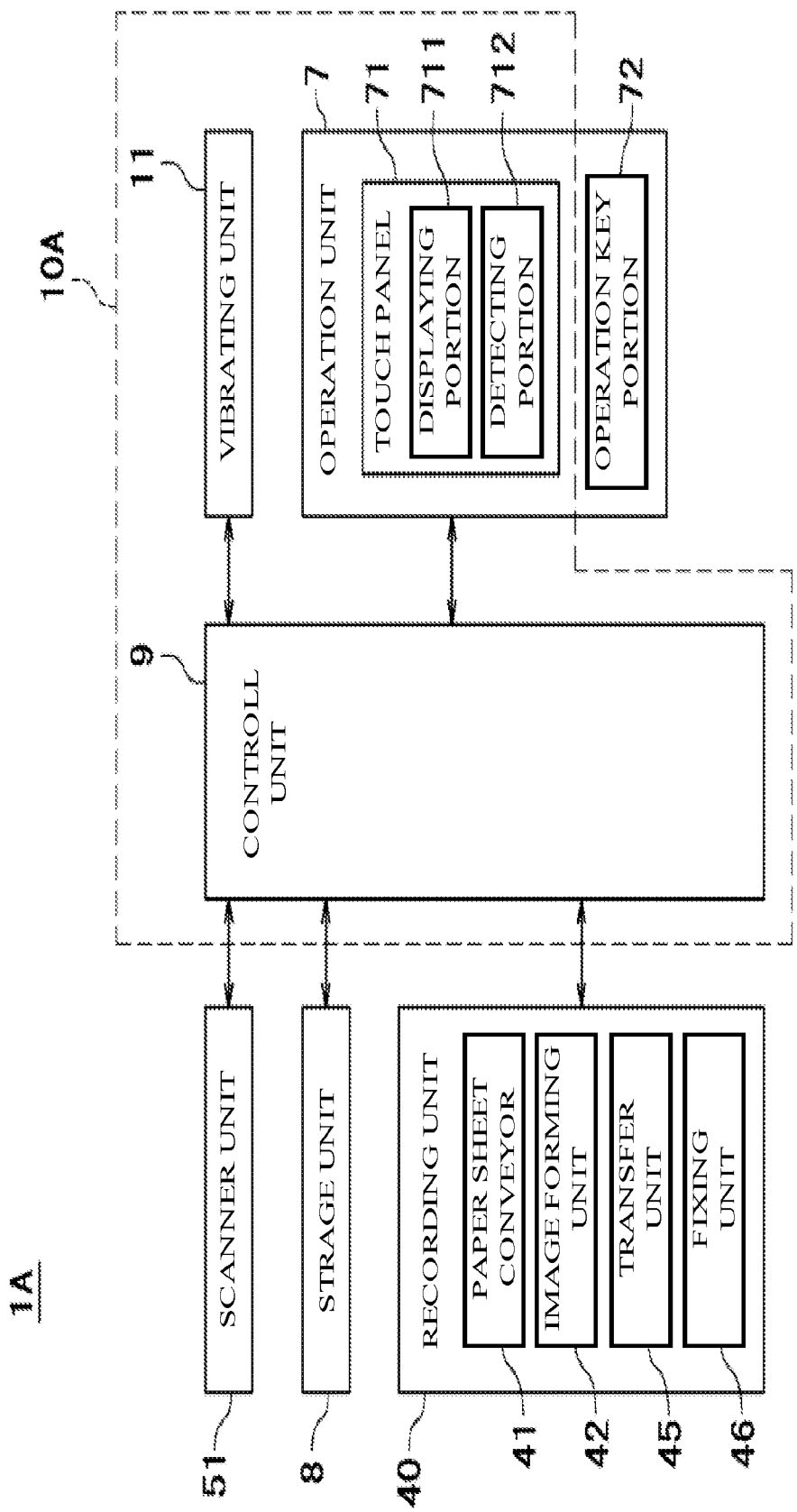
FIG. 6 is a control block diagram illustrating an input device according to another embodiment of the disclosure.

FIG. 6 is a control block diagram illustrating an input device 10A according to another embodiment of the disclosure. The following describes the input device 10A and an image forming apparatus 1A with the input device 10A according to this embodiment. In this embodiment, the input device 10A has a configuration similar to the embodiment described with reference to FIG. 1 to FIG. 5 except that a vibrating unit 11 is additionally provided. Therefore the described configurations will not be further elaborated here.

The vibrating unit 11 vibrates based on a signal of the control unit 9. The vibrating unit 11 is a vibration generating mechanism using, for example, a motor. The vibrating unit 11 is installed to transmit vibration to the touch panel 71. For example, the vibrating unit 11 is installed inside of the touch panel 71. In this embodiment, the vibrating unit 11 vibrates based on a generation of the special-operation-mode-based input portion 74 and/or an input operation to the special-operation-mode-based input portion 74 when the touch panel 71 is operated in the special operation mode.

Specifically, in the special operation mode, when a finger is brought into continuous contact with the touch panel 71 and the control unit 9 generates the special-operation-mode-based input portion 74 on the touch panel 71, the control unit 9 outputs an instruction signal for generating a vibration to the vibrating unit 11. As a result, the vibrating unit 11 vibrates at the time of the generation of the special-operation-mode-based input portion 74 based on the instruction signal.

In the special operation mode, when the finger is released from the touch panel 71 and the control unit 9 accepts the release of the continuous contact as an input to the special-operation-mode-based input portion 74, the control unit 9 outputs the instruction signal for generating a vibration to the vibrating unit 11. As a result, the vibrating unit 11 vibrates at the time of the input to the special-operation-mode-based input portion 74 based on the instruction signal.

The input device 10A of this embodiment has been described with reference to FIG. 6. According to this embodiment, in the special operation mode, the vibration of the vibrating unit 11 ensures notifying the user about the generation of the special-operation-mode-based input portion 74. As a result, the user can understand the timing when an input to the special-operation-mode-based input portion 74 is to be performed. In the special operation mode, the vibration of the vibrating unit 11 ensures notifying the user about the input to the special-operation-mode-based input portion 74. As a result, the user can confirm whether or not an input operation is performed to the special-operation-mode-based input portion 74.

In the above-described embodiment, in the special operation mode, the control unit 9 can further assign predetermined information to the generated special-operation-mode-based input portion 74. In this case, when the special-operation-mode-based input portion 74 receives an input, the control unit 9 can cause the image forming apparatus 1 to execute a predetermined operation based on the predetermined information assigned to the special-operation-mode-based input portion 74.

For example, when the control unit 9 assigns information for user authentication to the special-operation-mode-based input portion 74, the user can be authenticated by an input operation in the special operation mode. The following describes an exemplary user authentication operation by the input device 10 with reference to FIG. 5.

Specifically, at the time of a user authentication operation, the control unit 9 assigns signs for authentication to the respective special-operation-mode-based input portions 74. The signs for authentication may be characters and graphics. In this embodiment, the signs for authentication employ numerals. The control unit 9 sequentially assigns numerals of 1 to 6 to the special-operation-mode-based input portion 741 to the special-operation-mode-based input portion 746.

The user releases the contact with the special-operation-mode-based input portion 74 assigned with the numeral to input a password. The control unit 9 verifies the input password with a preliminarily registered password for authentication so as to perform authentication. The following describes an exemplary password for authentication requiring a simultaneous input of the signs "2" and "4" in the first phase, an input of the sign "1" in the second phase, and a simultaneous input of the signs "1", "3", and "6" in the third phase as an input order.

Firstly, the user performs a simultaneous input of the signs "2" and "4" of the password in the first phase. Specifically, the middle finger L2 of the left hand L and the index finger R1 of the right hand R, which respectively correspond to the special-operation-mode-based input portion 742 and the special-operation-mode-based input portion 744 respectively assigned with the signs "2" and "4", are simultaneously released from the touch panel 71. Thus, the signs "2" and "4" of the password in the first phase are input to the control unit 9.

Subsequently, the user inputs the sign "1" of the password in the second phase. Specifically, the index finger L1 of the left hand L, which corresponds to the special-operation-mode-based input portion 741 assigned with the sign "1", is released from the touch panel 71. Thus, the sign "1" of the password in the second phase is input to the control unit 9.

Subsequently, the user performs a simultaneous input of the signs "1", "3", and "6" of the password in the third phase. Specifically, in the input of the password in the second phase, the special-operation-mode-based input portion 741 corresponding to the sign "1" of the password disappears after the input. Thus, the index finger L1 of the left hand L is brought into contact with the touch panel 71 to generate the special-operation-mode-based input portion 741 again. The control unit 9 assigns a numeral of 1 to the special-operation-mode-based input portion 741.

Subsequently, the index finger L1 of the left hand L, the ring finger L3 of the left hand L, and the ring finger R3 of the right hand R, which respectively correspond to the special-operation-mode-based input portion 741, the special-operation-mode-based input portion 743, and the special-operation-mode-based input portion 746 assigned with the signs "1", "3", and "6", are simultaneously released from the touch panel 71. Thus, the signs "1", "3", and "6" of the password in the third phase are input to the control unit 9.

The control unit 9 verifies the input passwords with the preliminarily registered password for authentication. The control unit 9 verifies the password for each execution of the input. Additionally, the control unit 9 verifies the password after the input of the password in the respective phases is finished. As a result of the verification, in the case where the input passwords matches the preliminarily registered passwords for authentication, the control unit 9 causes the image forming apparatus 1 to execute a predetermined operation. On the other hand, as a result of the verification, in the case where the input passwords do not match the preliminarily registered passwords for authentication, the control unit 9 does not cause the image forming apparatus 1 to execute the predetermined operation.

The exemplary user authentication operation by the input device 10 according to this embodiment has been described above. Here, while in the above description with reference to FIG. 5 the control unit 9 sequentially assigns the numerals of 1 to 6 to the special-operation-mode-based input portion 741 to the special-operation-mode-based input portion 746, the disclosure is not limited to this. For example, the control unit 9 may randomly assign the numeral of 1 to 6 to the special-operation-mode-based input portion 741 to the special-operation-mode-based input portion 746.

While in each embodiment described above the image forming apparatus has been described as an example of the electronic apparatus, the disclosure is not limited to this. The input device is applicable to any electronic apparatus in which it is necessary to input personal information, for example, a mobile phone, a smart phone, a tablet type computer, and an automated teller machine (ATM). While the multi-functional peripheral has been described as an example of the image forming apparatus, the disclosure is not limited to this. The image forming apparatus may be a copier, a printer, or a facsimile.

The input device of the disclosure may be used in an electronic apparatus as input means for information. For example, the input device may be used in an image forming apparatus. The input device of the disclosure ensures suppressing leakage of input information to a third person at the time of input in a simplified configuration without use of a voice generating unit or a biological information reader.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An input device for receiving input operations causing execution of functions of an electronic device, the input device comprising:
   a touch panel configured to be switchable, by change in position of the touch panel, between an input-device normal operation mode in which the touch panel is viewable by parties other than a user of the input device, and an input-device special operation mode in which the touch panel is essentially out of third-party view; and
   a touch panel control unit configured such as, with the touch panel switched into the special operation mode,
      to generate, in response to continuous user contact on at least one portion of the touch panel, a special-operation-mode input area on the touch panel, the special-operation-mode input area including the at least one portion of user contact, and
      to accept release of the continuous user contact on the at least one portion of the touch panel as an electronic-device-function-executing input operation through the special-operation-mode input area on the touch panel.

2. The input device according to claim 1, further comprising a vibrating unit installed in the input device such as to transmit vibration to the touch panel, and configured to vibrate based on at least either the generation of the special-operation-mode input area on the touch panel, or the input through the special-operation-mode input area on the touch panel.

3. The input device according to claim 1, further comprising a sensor configured to detect change in inclination of the touch panel as touch-panel operation-mode-switching change in position of the touch panel, wherein the control unit is configured to switch the touch panel between the normal operation mode and the special operation mode according to sensor-detected change in inclination of the touch panel.

4. The input device according to claim 1, wherein the control unit is configured to assign code-indicating information to the at least one portion of user contact on the special-operation-mode input area.

5. The input device according to claim 4, wherein the control unit is configured to authenticate a user based on input by the user through the special-operation-mode input area.

6. The input device according to claim 1, wherein the control unit is configured such as, with the touch panel switched into the normal operation mode,
   to generate a normal-operation-mode input area and display the normal-operation-mode input area on the touch panel; and
   to accept user contact on a position in the normal-operation-mode input area as an electronic-device-function-executing input through the normal-operation-mode input area.

7. An electronic apparatus comprising the input device according to claim 1.

8. In an input device for receiving input operations causing execution of functions of an electronic device, and provided with a touch panel configured to be switchable, by change in position of the touch panel, between an input-device normal operation mode in which the touch panel is viewable by parties other than a user of the input device, and an input-device special operation mode in which the touch panel is essentially out of third-party view, an input method comprising:

switching the touch panel from the normal operation mode to the special operation mode;

generating, in response to continuous user contact on at least one portion of the touch panel, a special-operation-mode input area on the touch panel, the special-operation-mode input area including the at least one portion of user contact; and accepting release of the continuous user contact on the at least one portion of the touch panel as an electronic-device-function-executing input operation through the special-operation-mode input area on the touch panel.

9. The input method according to claim 8, wherein:

the generating includes performing continuous contact in a plurality of positions on the touch panel; and the accepting includes releasing the continuous contact in at least one position among the plurality of positions.

10. The input method according to claim 8, wherein the generating and the accepting are repetitively performed at least one time.

11. A non-transitory computer-readable recording medium storing an input control program for an input device for receiving input operations causing execution of functions of an electronic device, and provided with a touch panel configured to be switchable, by change in position of the touch panel, between an input-device normal operation mode in which the touch panel is viewable by parties other than a user of the input device, and an input-device special operation mode in which the touch panel is essentially out of third-party view, the input control program causing a computer to function as a touch-panel control unit configured such as, with the input-device touch panel switched into the special operation mode, to generate, in response to continuous user contact on at least one portion of the touch panel, a special-operation-mode input area on the touch panel, the special-operation-mode input area including the at least one portion of user contact, and to accept release of the continuous user contact on the at least one portion of the touch panel as an electronic-device-function-executing input operation through the special-operation-mode input area on the touch panel.

12. The non-transitory computer-readable recording medium according to claim 11, wherein the input control program further causes the computer to function to vibrate a vibrating unit installed in the input device such as to transmit vibration to the touch panel, based on at least either the generation of the special-operation-mode input area on the touch panel, or the input through the special-operation-mode input area on the touch panel.

13. The non-transitory computer-readable recording medium according to claim 11, wherein the control unit is configured to switch the touch panel between the normal operation mode and the special operation mode according to sensor-detected change in inclination of the touch panel.

14. The non-transitory computer-readable recording medium according to claim 11, wherein the control unit is configured to assign code-indicating information to the at least one portion of user contact on the special-operation-mode input area.

15. The non-transitory computer-readable recording medium according to claim 14, wherein the control unit is configured to authenticate a user based on input by the user through the special-operation-mode input area.

16. The non-transitory computer-readable recording medium according to claim 11, wherein the control unit is configured such as, with the touch panel switched into the normal operation mode, to generate a normal-operation-mode input area and display the normal-operation-mode input area on the touch panel; and to accept user contact on a position in the normal-operation-mode input area as an electronic-device-function-executing input through the normal-operation-mode input area.

* * * * *